United States Patent Office 2,712,124
Patented June 28, 1955

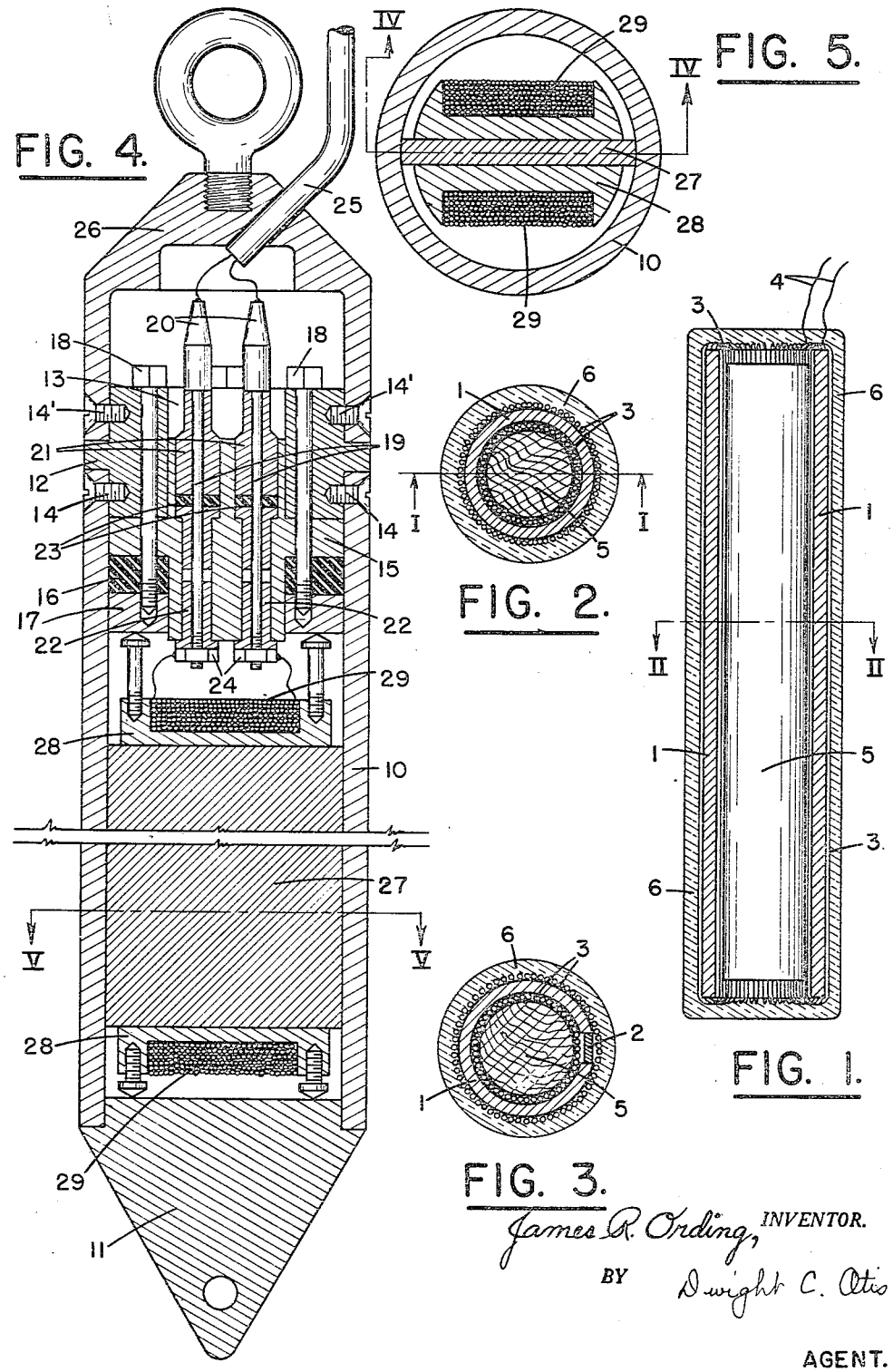

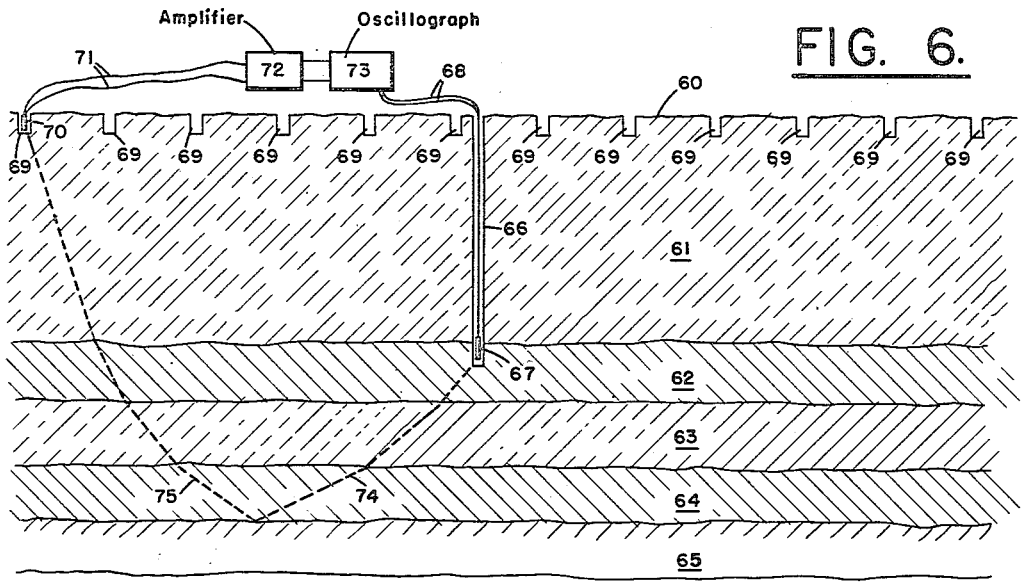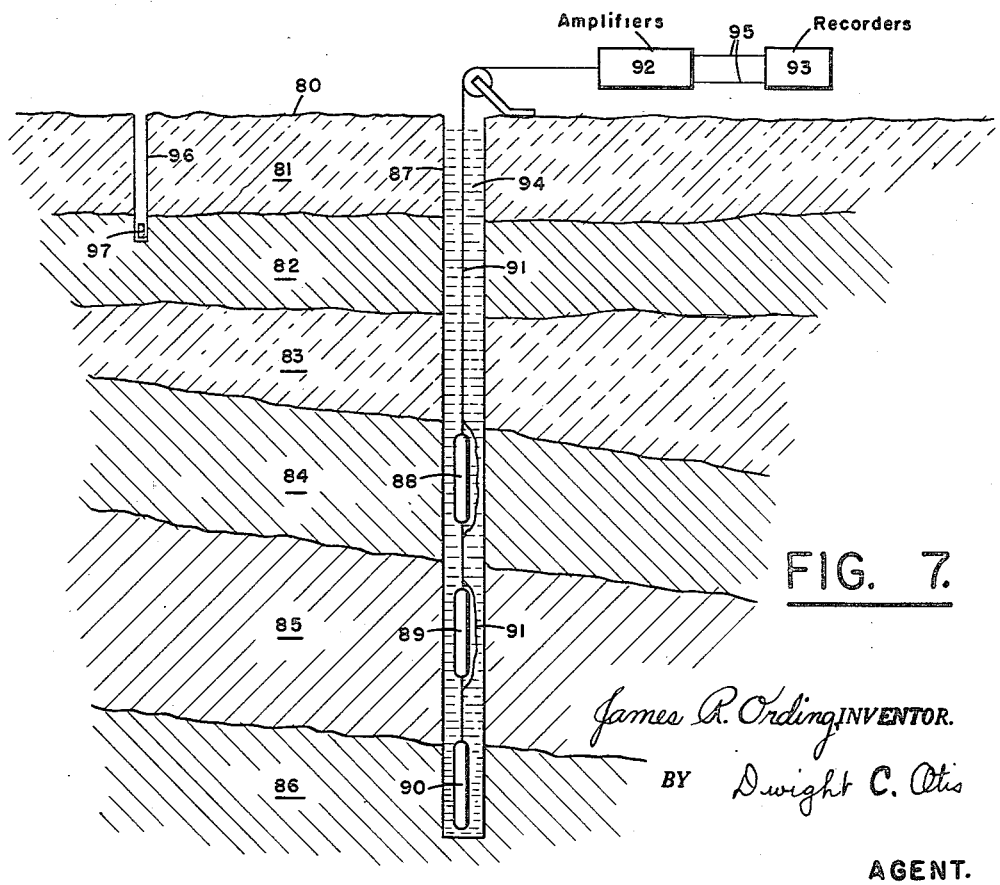

2,712,124

SEISMIC EXPLORATION METHOD AND APPARATUS

James R. Ording, Houston, Tex., assignor, by mesne assignments, to Esso Research and Engineering Company, Elizabeth, N. J., a corporation of Delaware Application March 26, 1948, Serial No. 17,178

6 Claims. (Cl. 340—15)

The present invention relates to improvements in seismic methods and apparatus. More particularly, the invention relates to improvements in methods and apparatus for seismic well logging and exploration of subsurface strata beneath selected areas of the earth.

In the art of seismic exploration, it is conventional to create a seismic disturbance of desired magnitude by firing a suitable charge of explosive in the earth. The vibrations produced by the disturbance have a wide range of frequencies varying from a few cycles to several thousand cycles per second and depart from the zone of the disturbance in all directions in the form of elastic waves. However, the relatively high frequency waves are attenuated very rapidly in the earth and do not travel far from the center of the disturbance, whereas the relatively low frequency waves are not attenuated as rapidly and may travel many miles from the scene of the disturbance. Accordingly, as used herein, it will be understood that the term "seismic waves" refers to elastic vibrations or waves which are propagated over long distances through a compressible or semi-compressible medium. The term will be understood to identify specifically those elastic waves which are propagated along a major portion of their paths through lithological formations of the earth and which have frequencies less than about 100 cycles per second.

Various workers have shown that the energy of seismic disturbances is transmitted, in part, along the surface of the earth by one or more types of surface waves, commonly called "ground roll," and, in part, through subsurface strata. Two main types of subsurface waves have been recognized, namely, longitudinal waves vibrating in the direction of propagation, and transverse waves vibrating substantially at right angles to the direction of propagation. The surface waves have high amplitude or intensity but travel at low velocity. The longitudinal subsurface waves, on the other hand, are of greatest interest in seismic exploration work since, although they have low amplitude, they travel through the earth at much higher velocity than either the subsurface transverse waves or the surface waves.

It is conventional in seismic exploration to create a seismic disturbance at a selected station by the method mentioned hereinbefore, and to measure the time of arrival of seismic waves at one or more seismic wave detectors arranged at known distances from the region of the disturbance. For seismic reflection work, the detectors are generally spaced apart in a substantially horizontal array along the surface of the earth at substantial lateral distances from the shot hole ranging from a few hundred to a few thousand feet. In seismic refraction work, the detectors may be similarly spaced but at distances ranging as high as several miles. For seismic well logging, the detectors are usually spaced one above the other at a desired depth in a borehole and the seismic disturbance may be created near the surface of the earth adjacent the borehole or at any desired distance remote therefrom. From records of the distances from shot point to detectors, the time when the seismic disturbance was produced, and the times of arrival of refracted or reflected waves at the detectors, calculations may be made which will indicate the nature of various geologic strata or facies changes and their depth beneath the surface.

A wide variety of sensitive seismic detectors have been employed in practicing these prior art methods. Jakosky in his book entitled "Exploration Geophysics," 1st edition (1940), page 571, has classified seismic detectors according to (1) type of detecting movement, i. e. mechanical or electrical, including specific nature of the electrical arrangement, and (2) aspect of the earth's motion which is detected. Each of the detectors utilized heretofore has depended for operation upon the relative movement of one part of the detector with respect to a spring-suspended inertia mass. In using any of these detectors, it is necessary to plant the outer case thereof firmly in the earth and to orient the detector vertically or horizontally according to the position for which it was designed. Thus, as the earth particles adjacent the detector case begin to move in response to the undulations of seismic waves, the case tends to move in the same direction and in a proportionate amount, while the inertia mass, usually arranged inside the detector case, tends to resist movement. Thereby a displacement of the case relative to the inertia mass is set up and a function of this mechanical displacement can be magnified and made measurable by electrical and/or optical means. In other words, seismic detectors of the prior art have been responsive to shaking applied to the outer case. Depending upon the nature of the particular electrical or optical means employed in these detectors, they have been made sensitive to either the displacement, the velocity or the acceleration of the seismic waves.

From the foregoing description it will be recognized that the methods and apparatus of the prior art have utilized either displacement or a mathematical derivative of displacement with respect to time in the measurement of seismic wave phenomena.

Because of the mechanical structure of seismic wave detectors of the prior art, these detectors sometimes have lacked ruggedness and stability, and have often required sensitive adjustments to be made thereto during construction and sometimes during use in the field. Since the inertia mass in each particular type of instrument has been designed to operate in a particular plane with respect to the earth's surface, it has been necessary to orient these detectors in a particular manner. Further since these detectors have been made sensitive to shaking, they have responded to artificially generated ground roll and to microseisms, i. e. small, naturally occurring, low amplitude and low frequency movements of the earth's surface caused, for example, by swaying bushes or trees, and by movement of distant objects upon the surface of the earth. These microseisms and the artificially produced ground roll appear to be uncontrollable movements which are particularly annoying in seismic refraction work since the amount of seismic energy which, in practice, can be transmitted through subsurface strata over long distance is, at best, very small; reliance must, therefore, be placed upon very high amplification of extremely small responses from the seismic wave detectors. Even though the prior art has taught the use of filters to eliminate low frequency responses from the records produced by electrical types of seismic detectors, the results have not been entirely satisfactory.

I have now discovered that improved seismic measurements may be made not by measuring displacement but by converting only the pressure attributes of seismic waves directly into electrical waves which may be amplified and recorded. The seismic wave detector employed in the practice of my invention is not responsive to displacement or shaking since it contains no moving parts. It is, however, electrically responsive to pressure. By omitting moving parts I have provided a rugged and stable seismic wave detector which requires no sensitive adjustments to be made thereto in the field. I have also provided a detector which need not be oriented in a specific direction and which is not responsive to ground roll or to microseisms.

The nature and objects of my invention will be better understood from the following description taken in conjunction with the accompanying drawing, in which:

Fig. 1 is a side elevation, partly in section, of one embodiment of apparatus suitable for use in the practice of my invention;

Fig. 2 is a sectional end view taken along the line II—II of the embodiment shown in Fig. 1;

Fig. 3 is a similar sectional end view illustrating a modification of the embodiment shown in Figs. 1 and 2;

Fig. 4 is a side elevation, partly in section, of another embodiment of apparatus particularly suitable for use in the practice of my invention under conditions wherein high hydrostatic pressures exist;

Fig. 5 is a sectional end view taken along the line V—V of the embodiment shown in Fig. 4;

Fig. 6 is a schematic representation of a section through several strata of the earth's crust illustrating one arrangement of apparatus for use in seismic exploration in accordance with the method of my invention; and Fig. 7 is a schematic representation of another section through several strata of the earth's crust illustrating another arrangement of apparatus for use in seismic well logging in accordance with my invention.

Referring first to Figs. 1, 2 and 3, the numeral 1 designates an elongated tubular element made of a metal or alloy capable of exhibiting strong magnetostrictive properties. While element 1 is illustrated as circular in transverse cross section, it may, if desired, be rectilinear, polygonal or elliptic in cross section. The element 1, as employed in the modification illustrated in Figs. 1 and 2, is constructed from a material capable not only of exhibiting magnetostrictive properties but also of being permanently magnetized. One alloy which is illustrative of a suitable material is known as 2V Permendur and comprises substantially 2% vanadium, 48% iron, and 50% cobalt. After heating to 1000° F. for 20 minutes, this alloy hardens, becomes permanently magnetizable, and will exhibit magnetostrictive properties to a high degree.

In the embodiment illustrated in Fig. 3 the element 1 may be formed from a tube, made of nickel, cobalt, or an alloy of these two metals, from which a narrow longitudinal section has been removed and replaced by a strip 2 of permanently magnetizable metal or alloy. Strip 2 may be, for example, steel or preferably an alloy, such as Alnico V, comprising substantially 8% aluminum, 14% nickel, 24% cobalt, 3% copper and 51% iron. The strip 2 may suitably be joined to element 1 by welding with soft iron rod.

Over element 1, or element 1 and strip 2, is wound an electrically conducting coil 3 comprising a plurality of turns of insulated wire terminating in the leads 4. The tuns of coil 3 are preferably wound in the form of a ring or torus wholly encasing element 1. Although in the drawing a single layer coil is shown, it is to be understood that a multilayer coil may be employed. The principal length of each turn of the conductor in coil 3 thus lies substantially parallel with the longitudinal axis of element 1 and is electromagnetically coupled to said element.

Disposed within element 1 is a loosely fitting relief plug 5 of rigid or semi-rigid, resilient material such as soft wood. Plug 5 serves primarily as a cushion against which the walls of element 1 may be slightly distorted by stresses applied to the outside surfaces thereof. Plug 5 also holds the turns of coil 3 in close proximity of the inner walls of element 1 at all times.

To exclude moisture and foreign materials, the assembly of parts described above may be impregnated with a thermo-plastic insulating resin 6. The insulating medium 6 is preferably a solid which, during application, is at least semi-liquid and will penetrate between the turns of coil 3 and make firm contact with the outer surface of element 1. In its finished form, medium 6 must be free from air bubbles so that minute stresses applied to the exterior thereof will be transmitted uniformly against the surfaces of element 1. Since, as will be more fully explained hereinafter, the seismic detector of my invention is preferably coupled to the earth by immersion in a liquid, it is important that means be provided to prevent entry of the coupling liquid against the inner surfaces of element 1. Accordingly, insulating medium 6 is applied in a manner to exclude the coupling liquid from entering between relief plug 5 and the inner walls of element 1. Insulating medium 6 may be selected from a wide variety of known plastic resins such as the polystyrene, acrylate, methacrylate, methyl methacrylate and the like resins.

If desired, a non-magnetic metal case (not shown) having perforated walls for free access of liquid therein may be arranged externally of insulating medium 6 to provide mechanical protection of the assembled seismic wave detector. The leads 4 may be anchored in suitable manner and brought out through the metal case for connection to a cable adapted to conduct the electrical output from coil 3 to suitable amplifying and recording apparatus arranged remote therefrom.

In order that the seismic wave detector of my invention will be responsive to compressional waves, element 1 or element 2 must be permanently magnetized. This magnetization may conveniently be accomplished by passing through coil 3 a unidirectional current, such as that obtainable from a 50 microfarad condenser charged at 2000 volts.

Referring now to Figs. 4 and 5, a seismic wave detector is shown adapted for use in the practice of my invention under conditions where high hydrostatic pressures exist, as, for example, in deep well bores filled with water or drilling fluid. The numeral 10 designates an elongated tubular element of magnetostrictive metal such as nickel, cobalt, or an alloy of these two metals. Suitably closing one end of element 10 is an end piece 11 preferably made of a non-magnetic metal such as brass. End piece 11 is preferably affixed to element 10 as by silver soldering. However, other means such as screw threads may be employed to join end piece 11 with element 10 and preferably make a fluid-tight joint. The other end of element 10 is closed by a non-magnetic metal end piece 12 provided with a central opening 13 for the passage of electrical conductors therethrough. So that elements to be described hereinafter may be placed in or removed from element 10, end piece 12 may be affixed to element 10 by means of a plurality of screws 14. So that fluid will not enter inside element 10 a seal comprising metal spider 15, compressible gasket 16, and plate 17 may be arranged within element 10 and adjacent end piece 12. Cap screws 18, passing through end piece 12, spider 15, gasket 16, and screw threadedly engaged into plate 17, may be tightened to compress gasket 16 and produce a fluid-tight seal with the walls of element 10. Electrically conducting rods 19, having suitable terminal heads 20, may be passed through insulating bushings 21 and 22 arranged on opposite sides of compressible insulating gaskets 23. By tightening nuts 24 threadedly engaged upon rods 19, a fluid-tight seal is provided permitting the electrical connection of a multi-conductor cable 25 to elements confined inside the cavity defined by element 10 and end pieces 11 and 12.

If desired a cap 26 having a suitable passage for cable 25 may be joined to end piece 12 by screws 14' and thereby provide mechanical protection of electrical terminals 20.

Within element 10 is a magnetized bar or plate 27 over which is arranged a coil form 28 made of any suitable electric insulating material such as Bakelite. Coil form 28 is suitably affixed to magnet 27 so that the electrically conducting coil of insulated wire 29 wound thereon is immovable with respect to magnet 27.

Magnet bar 27 may be any permanently magnetizable metal or alloy such as the strip 2 described with respect to Fig. 3. If desired bar 27 may be constructed of an alloy which is permanently magnetizable and also is capable of exhibiting magnetostrictive properties. In a preferred embodiment of my invention bar 27 is machined to fit snugly against diametrically opposite walls of element 10 so that coil 29 is incapable of any movement with respect thereto. Suitably, bar 27 may be made of such width that tubular element 10 must be compressed slightly along the diameter perpendicular to the diameter to be occupied by bar 27 in order that the latter may be slipped into element 10. It will be seen that magnet bar 27 being thus in contact with diametrically opposite walls of element 10 not only stiffens these walls against compression but also provides a direct path for magnetic flux to pass from the walls of element 10 and thence along the axis of coil 29.

The length of magnet bar 27 with respect to element 10 is not critical. However, it is preferable that bar 27 should be at least about 80 per cent of the length of element 10. In a practical embodiment of the apparatus of my invention element 10 was constructed from a 23-inch length of nickel tubing having a wall thickness of 0.29 inch, and outside diameter of 3 inches. Magnet bar 27 was approximately 19½ inches long, 0.25 inch thick and of such width as to fit tightly inside element 10. Magnet bar 27 was magnetized and polarized after installation within element 10 by arranging the assembled device between the poles of a strong electro-magnet in such a way that bar 27 was polarized transversely across its width. Alternatively, magnet bar 27 may be magnetized and polarized by connecting to the terminals 20 of coil 29 a 50 microfarad condenser which has been previously charged at about 2000 volts.

It will be seen that, as pressure, such as the pressure attributes of seismic waves, is applied to the outer surfaces of element 1 or element 10, these elements are slightly distorted from their normal shape. By virtue of their magnetostrictive properties and the presence of a polarizing magnet these elements produce changing magnetic lines of force which vary as a function of the pressure. These varying magnetic lines of force link through the turns of coil 29 and induce a current which, in turn, varies as a function of the pressure waves. The resulting current may be amplified and recorded by well-known means.

Turning now to Fig. 6, one method of seismic exploration over a selected area of the surface of the earth will be described wherein a plurality of the seismic wave detectors illustrated in Figs. 1 to 5 may be employed. The numeral 60 designates the surface of the earth while numeral 61 designates the unconsolidated surface strata commonly referred to as the "low velocity" or "weathered" layer. Similarly, the numerals 62, 63, 64 and 65 designate successively deeper lithologic or rock strata. A shot hole 66 preferably penetrating through layer 61 is drilled at a selected station in the area to be explored and a suitable charge of explosive 67, capable of being fired from a remote location, as by passing an electric current through conductors 68, is confined in the bottom thereof. A plurality of shallow ditches or boreholes 69 are laid out in conventional manner at known distances and any desired directions from shot hole 66. One or more seismic wave detectors selected from the types illustrated in Figs. 1 to 5 are placed in each hole and completely covered with a coupling medium such as water, oil or a fluid mud. Each detector, designated generally by the numeral 70, is connected by two conductors 71 to an amplifier 72 and recording oscillograph 73. For simplification in the drawing, only one detector with its associated conductors, amplifier and oscillograph have been shown. Further, since the amplifier and oscillograph are conventional in the art, details thereof are not shown but are represented by simple rectangles. Conductors 68 are also shown in the drawing as connecting to oscillograph 73 but it is to be understood that this showing is intended to represent any conventional manner of recording the instant of firing explosive charge 67. Conductors 68 will likewise be connected to conventional means (not shown) for firing the explosive.

After the seismic wave detectors have been placed and connected to the respective amplifiers and oscillographs, explosive charge 67 may be fired thereby generating seismic waves which radiate in all directions from the region of the disturbance. The path of one ray of these waves is represented by the broken line 74 in Fig. 6. It will be seen that this ray may be refracted slightly as the wave front passes from stratum 62 to 63 and again as it passes from stratum 63 to 64. For purposes of illustration it is assumed that stratum 65 is of such a nature that the seismic wave front is reflected along the path represented by the broken line 75 and ultimately is refracted until it reaches seismic wave detector 70. It has been observed that seismic waves are of such character that they contain both pressure and displacement attributes or components. Both of these attributes of any given ray arrive at detector 70 over substantially the same path. However, since detector 70 is not responsive to displacement, this attribute of the wave is not recorded by the detector. On the other hand, the pressure of the refracted and reflected wave front is received by detector 70 and is converted therein directly to an electrical current which varies as a function of the amplitude of the pressure wave. This electrical current is transmitted through conductors 71 to amplifier 72 where it may be amplified sufficiently to operate oscillograph 73.

Since the seismic disturbance produced by firing charge 67 is propagated in all directions, it is apparent that different rays of the wave front will reach each of the different seismic detectors and that the time of arrival may be different at each detector depending upon the distance of the detector from the source of the disturbance.

While, in the preceding paragraphs, the method of practicing my invention on dry land has been particularly described, it is to be understood the method may be practiced with facility in areas covered by extensive bodies of water such as lakes, rivers, ocean bays and the like, where the operator can place seismic detectors below the surface of the earth only with difficulty. In seismic exploration over areas covered by water, it is not necessary to place the seismic detectors in artificial ditches or boreholes. If desired, a plurality of detectors of the type described herein may be connected at spaced points along a multiconductor cable providing suitable pairs of conductors for each detector. The cable and detectors may thus be submerged in the body of water and towed to a desired zone in a manner such that the detectors will be upon the bottom of the body of water at desired distances from a predetermined shot point. The detectors will thus be adequately coupled to the earth and seismic waves reflected and/or refracted through the earth will be picked up thereby.

As is well known in seismic exploration work, it is often desirable to obtain information relative to the travel time of seismic waves through earth strata penetrated by a borehole. Heretofore, as in surface exploration, it has been conventional to lower into a deep borehole a seismic wave detector which was responsive to displacement; that is, one which contained an inertia mass. In order to procure the desired information it was necessary to provide means, such as wall hooks, whereby the seismic wave detector after lowering into the borehole could be secured to the earth formations adjacent the borehole. By employing the apparatus of the present invention, methods of seismic well logging are simplified and improved.

Referring now to Fig. 7, one method of seismic well logging will be described. The numeral 80 designates the surface of the earth having a plurality of subsurface lithologic strata, such as 81, 82, 83, 84, 85 and 86, penetrated by a borehole 87. A plurality of magnetostrictive detectors of seismic waves, such as 88, 89 and 90 which are preferably of the type illustrated in Figs. 4 and 5, are lowered into borehole 87 upon a cable 91. Cable 91 may be a multi-conductor cable providing suitable pairs of conductors electrically connecting each of the detectors to amplifying equipment 92 and recording equipment 93. Detectors 88, 89 and 90 may be spaced along cable 91 as desired and are usually suspended at fixed depths in the borehole when seismic measurements are conducted.

So that the detectors 88, 89 and 90 may be adequately coupled to the adjacent earth formations, borehole 87 should be filled with a liquid 94, such as water or drilling fluid, at least to a level above the uppermost detector 88.

The amplifiers employed with detectors 88, 89 and 90 are conventional to the art and, therefore, are not shown in detail but are represented collectively in the drawing by a simple rectangle 92. It is to be understood that each seismic wave detector will preferably have its own amplifier channel which will in turn be connected by a pair of conductors 95 to its own recording apparatus 93. Accordingly, amplifiers 92 will be understood to designate a bank of amplifiers. Recording apparatus 93 may be conventional recording oscillographs preferably providing one oscillograph for each seismic detector.

In order to produce seismic waves which will travel through the subsurface formations, a relatively shallow borehole 96, preferably penetrating through the low velocity surface layer, may be provided at a predetermined distance from borehole 87. A charge of explosive 97 may be placed in borehole 96 and be fired in the manner described with respect to Fig. 6. The time of firing the explosive may be recorded by conventional means.

It may be seen that, if shot hole 96 is remote, that is, several hundred to several thousand feet from the opening of borehole 87 at the surface of the earth, certain rays of the seismic waves propagated through the earth from the exploding charge will ultimately impinge upon each of the detectors 88, 89 and 90. It will further be seen that since detectors 88, 89 and 90 are nondirectional, they need not be oriented in any particular manner but will respond to rays of the seismic waves arriving at borehole 87 from any direction. The varying pressure of these rays or waves will be converted by detectors 88, 89 and 90 directly to varying electrical currents which may be amplified by amplifiers 92 and displayed or recorded by means 93.

While I have described specific embodiments of my invention, it will be apparent to skilled workers that many variations may be made in these embodiments without departing from the scope of the appended claims.

Having fully described and illustrated my invention, what I desire to claim and secure by Letters Patent is:

1. The method of exploration of subsurface strata of the earth which includes the steps of placing in a coupling medium, such as liquid on or in the earth at spaced points near the strata to be explored, a plurality of magnetostrictive seismic wave detectors, each having the ability to generate an electric current which varies as a function of the amplitude of the pressure components of seismic waves while being substantially unresponsive to displacement components of said seismic waves, firing, at a point laterally spaced from said detectors, an explosive charge, thereby causing seismic waves which have both pressure and displacement components to pass through or reflect from the strata to be explored, and recording the resultant variations in electric current generated in each of said detectors thereby obtaining data useful in making deductions as to the location or nature of the strata.

2. The method of exploration of subsurface strata of the earth which includes the steps of placing in a coupling medium, such as liquid on or in the earth near the strata to be explored, a seismic wave detector having the ability to convert pressure components of seismic waves directly into an electric current which varies as a function of the amplitude of the pressure components of the waves while being substantially unresponsive to displacement components of said seismic waves, producing in said strata at a point laterally spaced from said detector seismic waves which have both pressure and displacement components, and visibly displaying the resultant variations in the electric current of said detector thereby obtaining data useful in making deductions as to the location or nature of the strata.

3. In the art of seismic exploration wherein elastic waves are produced in lithologic strata of the earth at a first station along the surface thereof and said waves are propagated in said strata to a remote point spaced from said first station, the method which consists of recording electrical signals corresponding only to the pressure changes and excluding motional changes, produced in said strata by the propagated elastic waves at said remote point.

4. In the art of seismic exploration wherein elastic waves are produced in lithologic strata of the earth at a first station and said waves are propagated in said strata to a plurality of other spaced stations near the surface of the earth, the method which consists of recording electrical signals corresponding only to the pressure changes and excluding motional changes produced in said strata by the propagated elastic waves at said other stations.

5. In the art of seismic exploration wherein elastic waves are produced in lithologic strata of the earth at a first station and said waves are propagated in said strata to at least one other station below the surface of the earth in a borehole which is spaced from said first station, the method which consists of recording electrical signals corresponding only to the pressure changes and excluding motional changes produced in said strata by the propagated elastic waves at said other station.

6. The method of exploration of subsurface strata of the earth which includes the steps of placing in a coupling medium, such as liquid on or in the earth near the strata to be explored, a magnetostrictive seismic wave detector having the ability to convert pressure components of seismic waves directly into an electric current which varies as a function of the amplitude of the pressure components of the waves while being substantially unresponsive to displacement components of said seismic waves, producing in said strata at a point laterally spaced from said detector seismic waves, and visibly displaying the resultant variations in the electric current of said detector.

References Cited in the file of this patent

UNITED STATES PATENTS

| 1,495,429 | Nicolson | May 27, 1924 |
| 2,138,036 | Kunze | Nov. 29, 1936 |
| 2,190,686 | Slichter | Feb. 20, 1940 |
| 2,257,187 | Owen | Sept. 30, 1941 |

(Other references on following page)

UNITED STATES PATENTS

| | | |
|---|---|---|
| 2,354,548 | Ricker | July 25, 1944 |
| 2,364,209 | Green | Dec. 5, 1944 |
| 2,376,156 | Kuehni | May 13, 1945 |
| 2,390,187 | Sharpe | Dec. 4, 1945 |
| 2,398,401 | Bancroft et al. | Apr. 16, 1946 |
| 2,408,478 | Petty | Oct. 1, 1946 |
| 2,417,077 | Hoover | Mar. 11, 1947 |
| 2,418,132 | Maxfield | Apr. 1, 1947 |
| 2,440,903 | Massa | May 4, 1948 |